(12) United States Patent
Muck et al.

(10) Patent No.: US 8,403,416 B2
(45) Date of Patent: Mar. 26, 2013

(54) ADJUSTABLE ARMREST WITH PUSH BUTTON

(75) Inventors: Todd Rupert Muck, Fowlerville, MI (US); Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 223 days.

(21) Appl. No.: 12/909,082

(22) Filed: Oct. 21, 2010

(65) Prior Publication Data
US 2012/0098319 A1 Apr. 26, 2012

(51) Int. Cl.
*B60N 2/46* (2006.01)
(52) U.S. Cl. .............................. 297/411.32; 297/411.38
(58) Field of Classification Search ............. 297/411.38, 297/411.35, 411.32, 411.3
See application file for complete search history.

(56) References Cited

U.S. PATENT DOCUMENTS

| | | | |
|---|---|---|---|
| 141,318 A * | 7/1873 | Buchanan | ..................... 297/317 |
| 4,205,879 A | 6/1980 | Heling | |
| 4,307,913 A | 12/1981 | Spiegelhoff | |
| 4,619,478 A * | 10/1986 | Heimnick et al. | ............. 296/153 |
| 5,076,645 A | 12/1991 | Yokota | |
| 5,106,160 A * | 4/1992 | Nomura et al. | .......... 297/411.32 |
| 5,984,416 A | 11/1999 | Waldo et al. | |
| 6,467,847 B2 | 10/2002 | Bidare | |
| 7,140,688 B2 | 11/2006 | Hann | |
| 7,163,248 B2 | 1/2007 | Adams et al. | |
| 7,726,745 B2 * | 6/2010 | Bruns et al. | ............. 297/411.36 |
| 2008/0296954 A1 | 12/2008 | Liu et al. | |
| 2009/0026826 A1 | 1/2009 | Cebula et al. | |
| 2009/0127911 A1 * | 5/2009 | Schumacher et al. | ... 297/411.38 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

The present invention provides for a vehicle armrest assembly mounted to a vehicle seat back movable from a stowed position to a functioning position. The armrest assembly includes an armrest housing having a gas shock disposed within the armrest housing. A pivot bracket is mounted within the armrest housing and in line with the gas shock. The pivot bracket has a first end and a second end. The first end of the pivot bracket abuts the gas shock so as to actuate a nozzle on the gas shock. The second end of the pivot bracket abuts a button. When the button is pressed, the button pushes the pivot bracket, transfers energy through the pivot bracket to the nozzle of the gas shock, and actuates the nozzle of the gas shock thereby permitting movement of the armrest assembly.

15 Claims, 3 Drawing Sheets

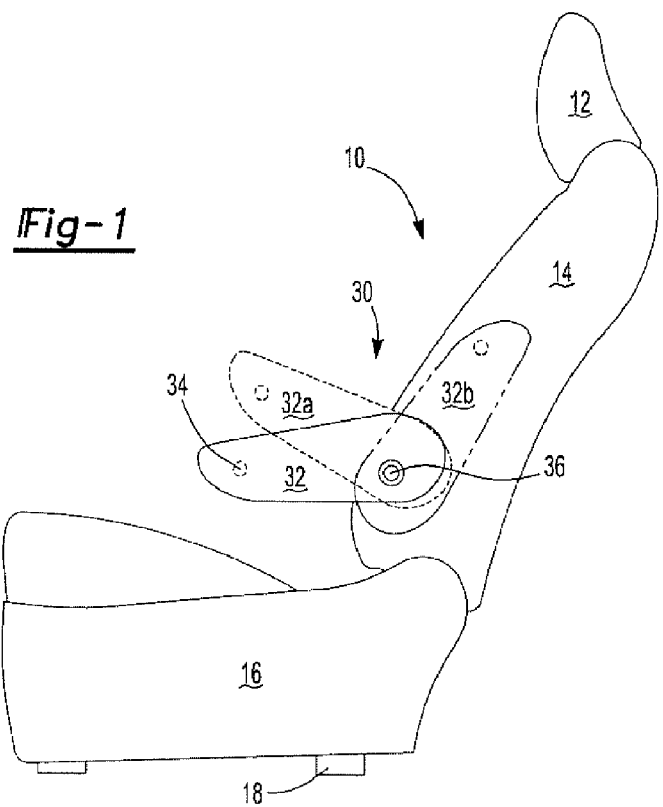
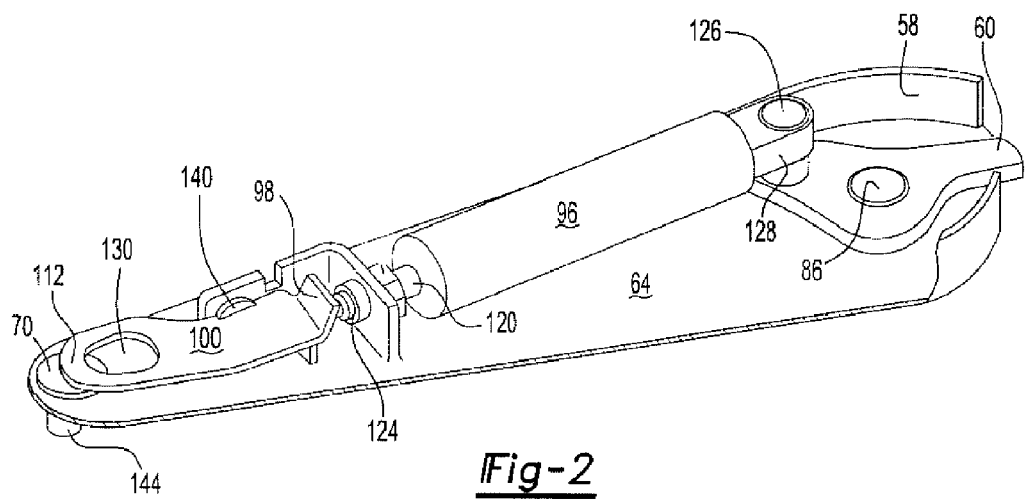

ADJUSTABLE ARMREST WITH PUSH BUTTON

FIELD OF THE INVENTION

This invention relates generally to automotive vehicle seat armrests. In particular, this invention relates to a vehicle seat armrest using a gas shock.

BACKGROUND OF THE INVENTION

Automotive interiors include various accessories and features intended to promote comfort and convenience for users of the vehicle. For example, vehicles are commonly provided with armrests on vehicle seats which are adjustable to accommodate various size passengers. Known armrest designs are adjustable pivotally about a pivot point on one side of a vehicle seat frame so that when an armrest is in use it is disposed at a level above the seat cushion of the vehicle seat. When the armrest is not in use, the armrest may be tilted about the pivot point to a stowed position, generally parallel and adjacent to the vehicle seat back. To accommodate ingress and egress of the vehicle, the armrest may be moved to and from the stowed position as desired.

Common configurations of vehicle seat armrests include incorporating springs to facilitate movement of the armrest. These armrest structures are complex and often awkward to use. These designs are also costly to manufacture for use in high volume to incorporate in a vehicle. Furthermore, a spring structure occupies a higher volume of area within the armrest structure.

Accordingly, it is highly desirable to provide a vehicle armrest structure having low cost to manufacture, low volume packaging, and ease of use to the passenger.

SUMMARY OF THE INVENTION

The present invention provides for a vehicle armrest assembly mounted to a vehicle seat back movable from a stowed position to a functioning position. The armrest assembly includes an armrest housing having a gas shock disposed within the armrest housing. A pivot bracket is mounted within the armrest housing and in line with the gas shock. The pivot bracket has a first end and a second end. The first end of the pivot bracket abuts the gas shock so as to actuate a nozzle on the gas shock. The second end of the pivot bracket abuts a button. When the button is pressed, the button pushes the pivot bracket, transfers energy through the pivot bracket to the nozzle of the gas shock, and actuates the nozzle of the gas shock thereby permitting movement of the armrest assembly.

BRIEF DESCRIPTION OF THE DRAWINGS

FIG. 1 is a side view of a vehicle seat incorporating the armrest assembly;

FIG. 2 is a perspective view of a fully assembled armrest assembly;

DETAILED DESCRIPTION OF THE INVENTION

Figure 3:
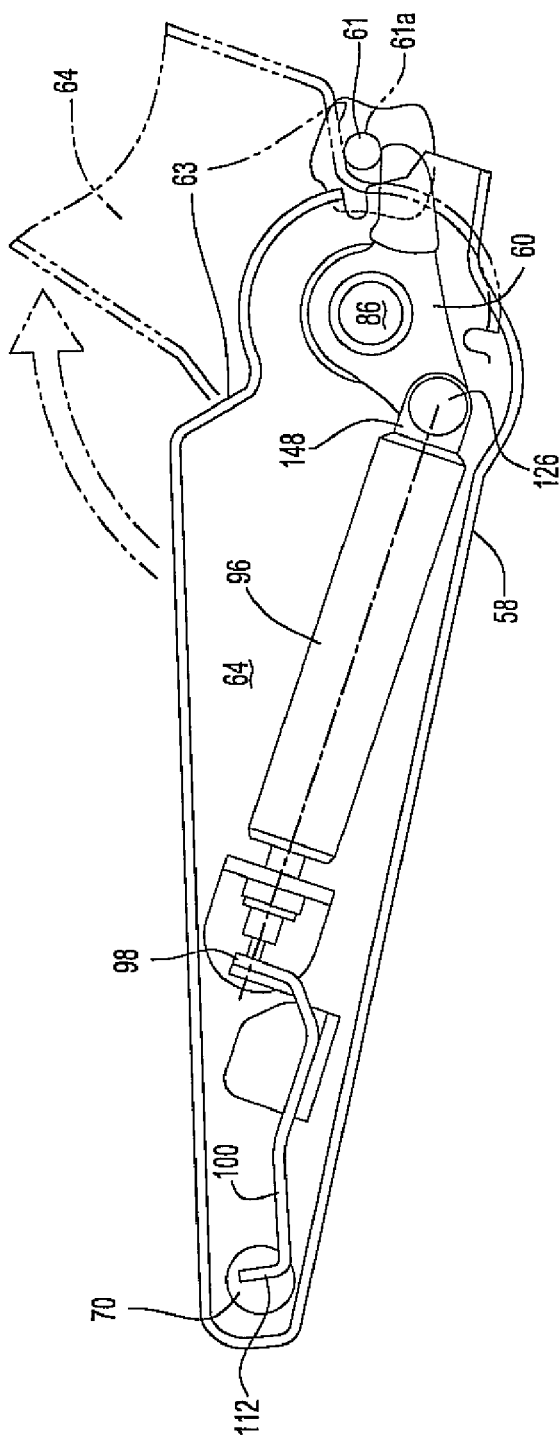
FIG. 3 is a side view of a fully assembled armrest assembly.
Figure 4:
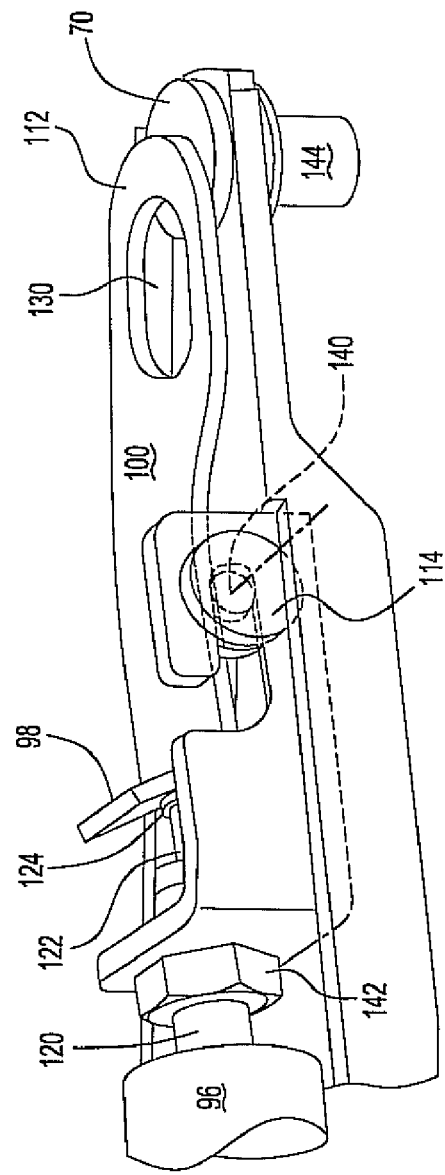
FIG. 4 is a perspective view of an assembled armrest assembly.
Figure 5:
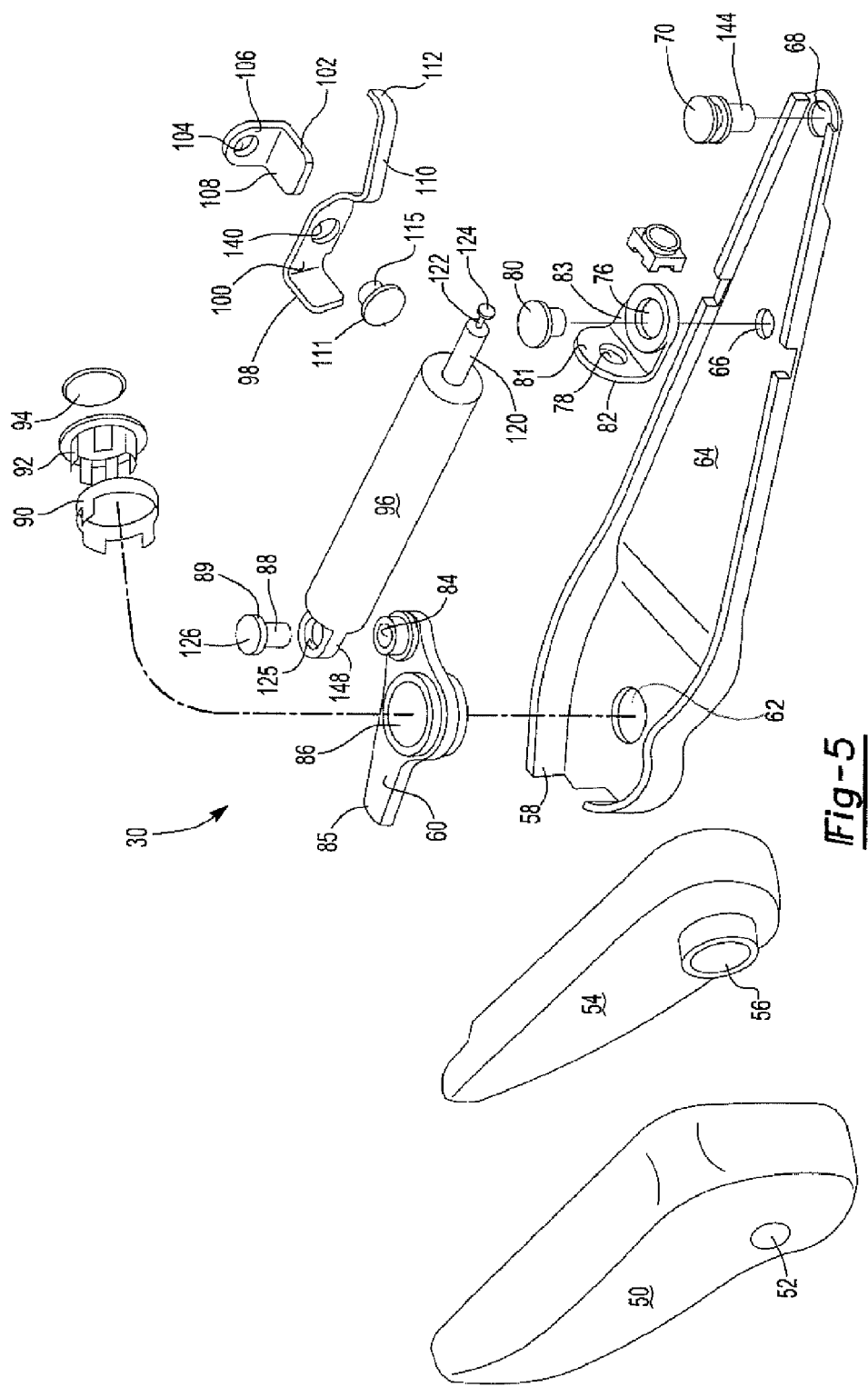
FIG. 5 is an exploded perspective view of the armrest assembly.

The present invention provides for an armrest assembly mounted to a vehicle seat back movable from a stowed position to a functioning position to accommodate egress and ingress of a vehicle passenger. The armrest assembly includes an armrest housing having a gas shock disposed therein. A main pivot bracket mounted within the armrest housing and also mounted in line with a gas shock communicates with a user-operated button and a nozzle on the gas shock to permit movement of the armrest assembly.

As shown in FIG. 1, the armrest assembly 30 attaches to the seat back 14 at the pivot point 36. The seat back 14 further includes a headrest 12 disposed at the top of the seat back 14. The seat assembly 10 further includes a seat bottom 16 resting on a track 18. The seat back 14 connects to the seat bottom 16. The seat back 14 may be pivotally connected to the seat bottom 16. The armrest assembly 30 is shown at various positions. The armrest 32 includes the button actuator 34 to move the armrest assembly 30 and the armrest 32 to various positions. Position 32a of the armrest 32 shows one of the many positions the user may place the armrest 32 in. The position 32b is the stowed position of the armrest 32. The user may put the armrest 32 in the stowed position 32b to facilitate ingress or egress of the vehicle.

The seat assembly 10 is a common bucket seat assembly typical in many automotive vehicles. The seat assembly 10 is mounted on a track 18 by the seat bottom 16. The seat assembly 10 is slidable along a track to further facilitate ingress and egress of the vehicle.

The seat assembly 10 includes a main frame and a cushioned outer surface. The headrest 12, the seat back 14, and the seat bottom 16 all include a wire frame structure. The headrest 12, the seat back 14, and the seat bottom 16 further include a cushion and fabric outer covering to promote comfort to the vehicle user.

The armrest assembly 30 includes a housing 64 having a plurality of apertures 62, 66, 68. The housing 64 includes a lip 58. The housing 64 is further covered by a plastic cover 54 and a foam trim 50. The plastic cover 54 is comprised of a highly rigid material to facilitate structure of the armrest assembly 30. The foam trim 50 is soft to provide comfort to a user. The foam trim 50 may be further covered in a fabric cover. The foam trim 50 includes an aperture 52 to connect the foam trim to the seat back. The plastic cover 54 includes an aperture 56 to connect the plastic cover to the seat back 14.

A rocker arm 60 is provided having an aperture 86 and a rivet aperture 84. The aperture 86 of the rocker arm 60 connects to the aperture 62 of the housing 64. The rocker arm 60 further includes the arm 85 disposed opposite to the rivet aperture 84. The rivet aperture 84 connects to the gas shock 96. The gas shock 96 is disposed within the housing 64. The gas shock includes a first end 126 and a second end 120. The first end 126 of the gas shock 96 includes an aperture 148 which connects to the rivet aperture 84 of the rocker arm 60. The aperture 148 of the gas shock 96 connects to the rivet aperture of the rocker arm 60 by means of a rivet 126 to secure the rocker arm 60 securely to the gas shock 96. The rivet 126 includes a rivet shoulder 88. The rivet 126 further includes a head member 89.

A pin 61 further provides for a stopping means of the rocker arm 60. The pin 61 is mounted to the seat back 14. As shown in FIG. 3, when the armrest assembly 30 is moved toward the stowed position (as shown with the housing 64 raised to a stowed position), the armrest assembly 30 pulls away from the pin 61 and the housing 64 acts as the full up stow stopper. The pin 61 contacts the rocker arm 60. In the stowed position, an indentation 63 provided on the housing 64 rests on the pin 61 (as shown in position phantom position 61a).

The gas shock 96 further includes a second end 120. The second end 120 includes a nozzle 122 to allow air or gas to escape and enter the gas shock 96 to facilitate adjustment of the armrest assembly 30. The nozzle 122 includes a button 124 operable to push within the nozzle to facilitate movement of air in and out of the gas shock 96.

The rocker arm 60 further connects to the housing 64 of the armrest assembly 30 by means of a bezel 92. The bezel 92 includes a button bezel 90 and a push button 94 to facilitate assembly. The button bezel 90, the bezel 92, and the push button 94 rest within the aperture 86 of the rocker arm 60 and connect to the aperture 62 of the housing 64. The button bezel 90, the bezel 92, and the push button 94 when connected to the aperture 86 of the rocker arm 60 create a secure connection of the rocker arm 60 to the housing 64.

By means of the pivot bracket 100, the nozzle 122 of the gas shock 96 is pushed and actuated by the button actuator 70. The pivot bracket 100 includes a first end 98 and a second end 112. The pivot bracket 100 includes an aperture 140 to facilitate connection to the housing 64. The pivot bracket 100 further includes an arm 110 to extend the second end 112 closer to the button actuator 70.

The pivot bracket 100 is connected to the housing 64 by means of an attachment bracket 102. The attachment bracket 102 is generally L-shaped and includes a base 108, an upper portion 106, and an aperture 104. The aperture 104 is incorporated on the upper portion 106. The base 108 and the upper portion 106 are generally planar and intersect at a perpendicular angle.

The aperture 104 of the attachment bracket 102 abuts the aperture 140 of the pivot bracket 100, and the pivot bracket 100 and the attachment bracket 102 are then connected by a rivet 114. The rivet 114 includes an upper portion 111 and a shoulder 115. The shoulder 115 inserts within the aperture 140 of the pivot bracket 100 and through the aperture 104 of the attachment bracket 102. Once fully assembled by the rivet 114, the pivot bracket 100 is pivotable about the rivet 114.

Gas shock attachment bracket 82 is generally L-shaped and includes an upper portion 81 and a base portion 83. The upper portion 81 of the gas shock attachment bracket 82 includes an aperture 78 adapted to accept the second end 120 of the gas shock 96. The second end 120 of the gas shock 96 rests within the aperture 78 of the upper portion 81 of the gas shock attachment bracket 82 to further secure the gas shock 96 to the housing 64 of the armrest assembly 30. The gas shock attachment bracket 82 further includes the base portion 83 to secure the gas shock 96 to the housing 64. The base portion 83 of the gas shock attachment bracket 82 includes an aperture 96 operable to accept a rivet 80. The rivet 80 extends through the aperture 76 of the base portion 83 of the gas shock attachment bracket 82 and extends through the aperture 66 of the housing 64. The rivet 80 secures the gas shock attachment bracket 82 to the housing 64 thereby securing the gas shock 96 to the housing 64.

A button actuator 70 is provided at a distal end of the housing 64. The button actuator 70 is provided to actuate the nozzle 122 of the gas shock 96 to facilitate adjustment of the armrest assembly 30. The button actuator 70 includes a shoulder 144. The aperture 68 of the housing 64 is operable to accept the button actuator 70. The button actuator 70 is accessible to the user of a vehicle.

The first end 98 of the pivot bracket 100 includes a generally planar surface. The generally planar surface of the first end 98 may be slightly inclined or angled to facilitate movement. The planar surface of the first end 98 contacts the button 124 of the nozzle 122 of the gas shock 96.

The second end 112 of the pivot bracket 100 contacts the button actuator 70. When the user of a vehicle seat presses the button actuator 70, the button actuator 70 abuts the second end 112 of the pivot bracket 110 thereby pivoting the pivot bracket 110 about the pivot point 140 and slides the planar surface of the first end 98 on the button 124 of the nozzle 122 of the gas shock 96. Pushing the button 124 of the nozzle 122 of the gas shock 96 releases air from the gas shock 96 and allows movement of the armrest 30. When the user releases the button 70 on the armrest assembly 30, the armrest assembly 30 stays in the current position.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A vehicle armrest assembly adjustable mounted to a vehicle seat movable from a stowed position to a functioning position, the armrest assembly comprising:
    an armrest housing, the armrest housing pivotally mounted to the vehicle seat;
    a gas shock disposed within the armrest housing;
    a button mounted in the armrest housing accessible to a vehicle passenger; and
    a pivot bracket mounted between the gas shock and the button, the pivot bracket abutting the button, the pivot bracket abutting the gas shock, the pivot bracket actuated when the vehicle passenger presses the button thereby pivoting the pivot bracket to actuate the gas shock.

2. The armrest assembly of claim 1, wherein the pivot bracket is elongated.

3. The armrest assembly of claim 1, wherein a rocker arm is provided connected to the gas shock, wherein actuation of the gas shock rotates the rocker arm.

4. The armrest assembly of claim 1, wherein the first end of the pivot bracket includes a planar surface.

5. The armrest assembly of claim 4, wherein the planar surface includes a small angle.

6. The armrest assembly of claim 5, wherein the small angle of the planar surface does not exceed 30°.

7. The armrest assembly of claim 1, wherein a nozzle of the gas shock allows for a passage of air in and out of the gas shock.

8. The armrest assembly of claim 7, wherein the gas shock is mounted to the armrest housing by an attachment bracket.

9. The armrest assembly of claim 8, wherein the attachment bracket includes a first aperture.

10. The armrest assembly of claim 9, wherein the first aperture is large enough to accept the nozzle of the gas shock.

11. The armrest assembly of claim 1, wherein the pivot bracket includes a first pivot point.

12. The armrest assembly of claim 11, wherein the armrest pivots about a second pivot point located on the vehicle seat.

13. The armrest assembly of claim 12, wherein the armrest pivots about the second pivot point on the side of the vehicle seat.

14. The armrest assembly of claim 11, wherein the pivot bracket further includes an actuation lever, said actuation lever defined by an area between the first pivot point and the second end.

15. The armrest assembly of claim 11, wherein the pivot bracket is connected to the armrest housing at the first pivot point by a rivet.

* * * * *